(No Model.) 3 Sheets—Sheet 1.
G. R. BOAZ.
PHOSPHATE SEPARATOR AND SCREEN WASHER.

No. 480,549. Patented Aug. 9, 1892.

(No Model.) 3 Sheets—Sheet 2.

G. R. BOAZ.
PHOSPHATE SEPARATOR AND SCREEN WASHER.

No. 480,549. Patented Aug. 9, 1892.

WITNESSES:
L. Douville
A. C. Jennings.

INVENTOR
George R. Boaz,
BY John A. Niederstein
ATTORNEY.

(No Model.) 3 Sheets—Sheet 3.

G. R. BOAZ.
PHOSPHATE SEPARATOR AND SCREEN WASHER.

No. 480,549. Patented Aug. 9, 1892.

WITNESSES:
L. Douville,
A. P. Jennings.

INVENTOR
George R. Boaz
BY
ATTORNEY.

UNITED STATES PATENT OFFICE.

GEORGE R. BOAZ, OF TAMPA, FLORIDA.

PHOSPHATE-SEPARATOR AND SCREEN-WASHER.

SPECIFICATION forming part of Letters Patent No. 480,549, dated August 9, 1892.

Application filed August 25, 1891. Serial No. 403,700. (No model.)

*To all whom it may concern:*

Be it known that I, GEORGE R. BOAZ, a citizen of the United States, residing at Tampa, in the county of Hillsborough, State of Florida, have invented a new and useful Improvement in Phosphate-Separators and Screen-Washers, which improvement is fully set forth in the following specification and accompanying drawings.

My invention consists of improvements in phosphate-separators and screen-washers, as will be hereinafter set forth and definitely claimed.

Figure 1:
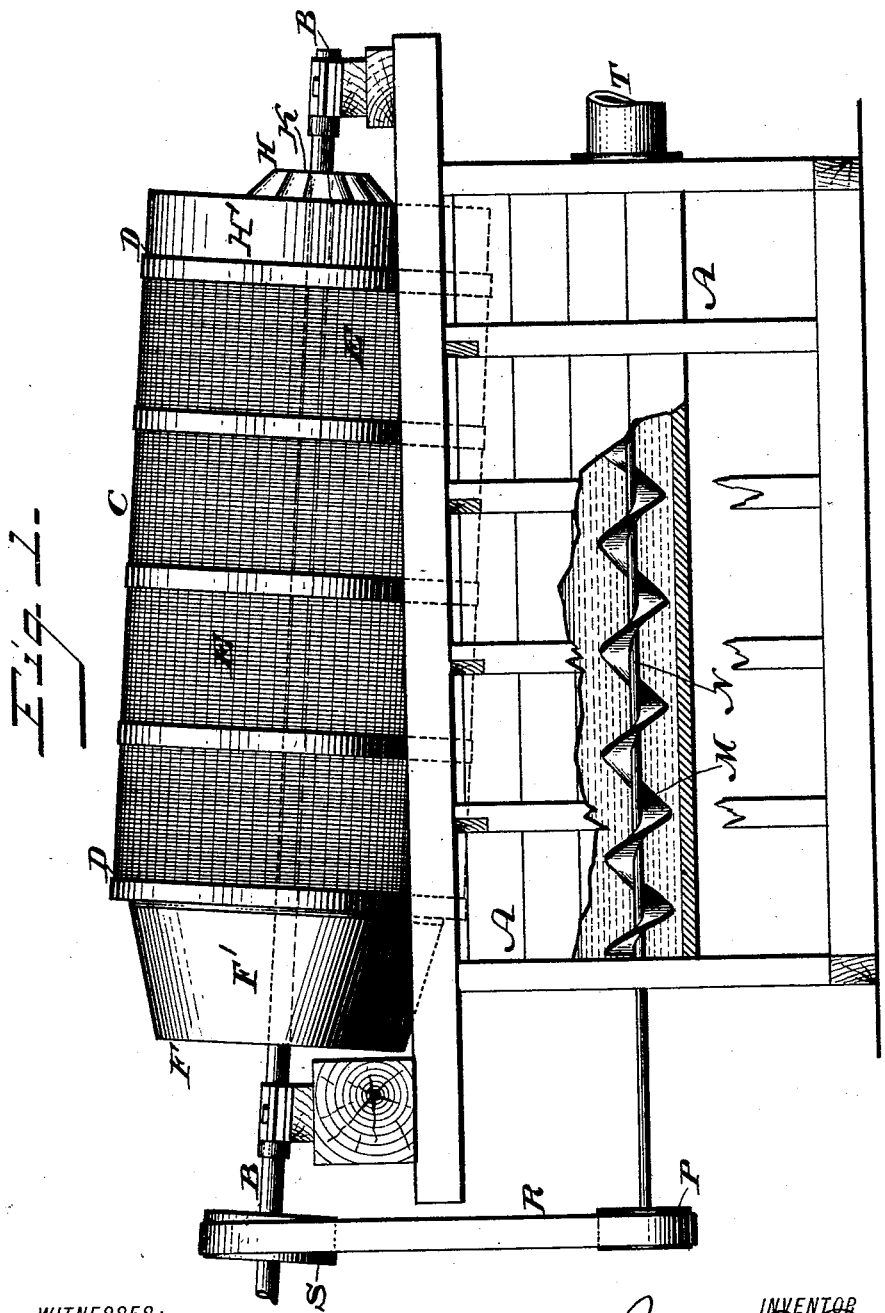
Figure 2:
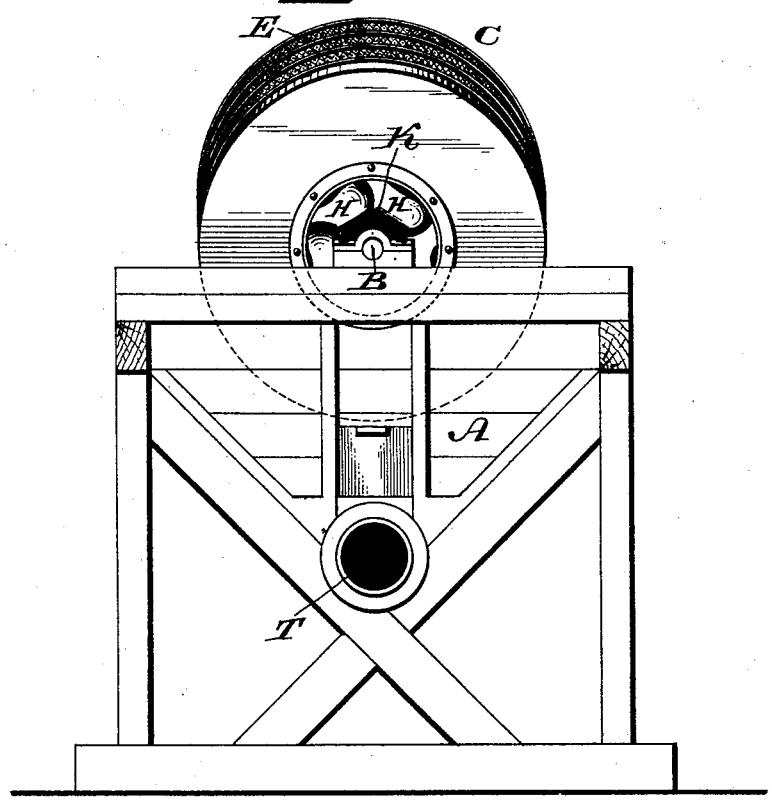
Figure 3:
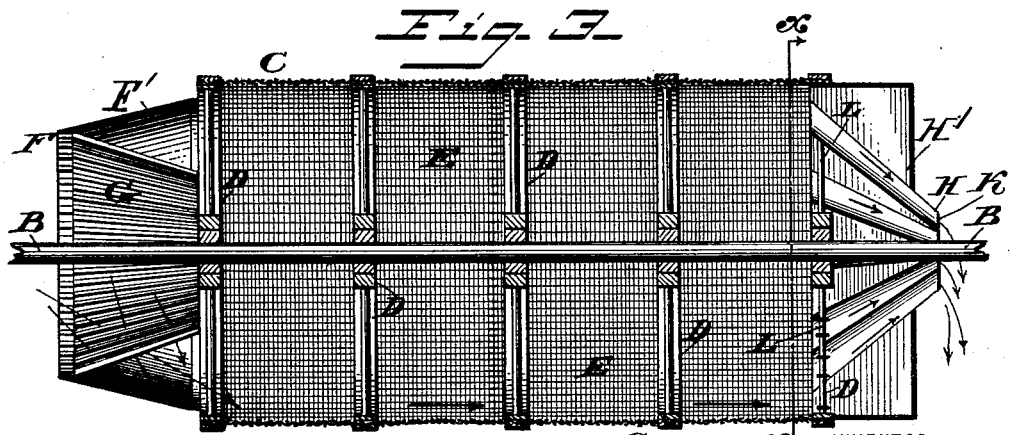
Figure 4:
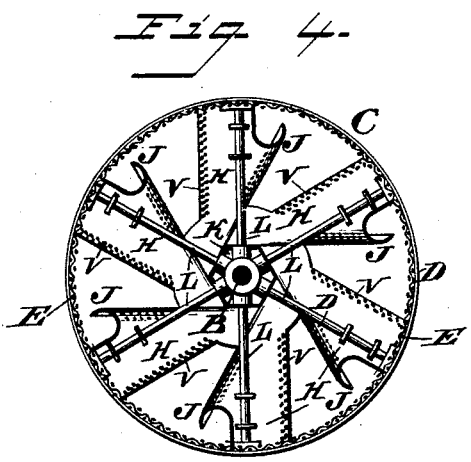

Figure 1 represents a side view of the device embodying my invention partly broken away. Fig. 2 represents an end view thereof. Fig. 3 represents a central longitudinal section in elevation. Fig. 4 represents a sectional view on line $x$ $x$, Fig. 3, showing the buckets at the discharging end of the screen.

Similar letters of reference indicate corresponding parts in the several figures.

Referring to the drawings, A designates a tank, on the frame of which is mounted the shaft B of an inclined screen or washer C. The said screen is mainly cylindrical in shape and is formed of a framework D, having wire-cloth or other suitable reticulated material E thereon, and has its front or receiving end F, which is of conical shape, provided with a screen G, formed of a series of steel or other bars arranged on such conical form that their inner ends are closer together than their outer ends. The end F is of the form of a conical collar with a closed side wall, forming a chute F', the same encircling the screen G, it being seen that the screen G and chute F' are conical in reverse order, whereby the material which is pumped therein is separated, the coarser matter—such as stones, lumps of clay, pieces of wood, muck, &c.—being ejected or thrown back outside of the screen, while the phosphate and finer substances pass between the bars and drop into the chute F', which, having its wide end at the place of connection with the screen C, directs said phosphate and fine substance into the body of the screen. The chute F' completely incloses the periphery of the screen G and retains the phosphate and dust within the same, so that the said material is unfailingly directed into the screen. The discharging end portion of the said screen is provided with a series of converging buckets or scoops H, formed of metal or other suitable material, each having an inwardly-curved portion J on one side near its inner end adapted to enter the mass of material in contact therewith within the screen, so as to lift and convey it to the opening K, formed between the outer ends of the said buckets. Around the buckets is a hood H', which stops the material that may fly off from the buckets. The buckets H are suitably secured to the radial bars L, which are connected with the shaft B and a peripheral portion of the framework of the screen.

Within the tank A is a conveyer M, the shaft N of which is provided with a pulley P, connected by a band R with a pulley S on the shaft B, whereby motion is obtained from the rotation of the said shaft B, the latter receiving its motion from any suitable motor.

The screen or washer C is inclined from its receiving to its discharging end, dipping in the tank A, so that the water entering the screen and escaping therefrom into said tank serves to wash or separate the material in the screen as the latter is rotated within the said tank.

In operating the apparatus the material from which the phosphates are to be separated is pumped into the receiving-screen G, which is rotated by any suitable means, so as to fall upon the grate-bars G, whereby the coarser materials are thrown back or outside of the screen, while the phosphate and other finer materials enter the screen E through the said bars and the chute F', and owing to the incline of said screen E are carried along to the discharging end, where they come in contact with the rotating scoops or buckets H, which lift the same, so that they are carried or forced to and through the opening K, from whence they are directed to a suitable receptacle. While in the body of the screen, owing to the rotation thereof and the dipping of the same in the tank, the phosphates are thoroughly disintegrated and washed, so that sand, muck, and other like substances therein pass through the reticulated covering into the tank and are moved along in the same by the conveyer M until they reach one end of the said tank, from whence they may be removed through a discharge-pipe T.

The buckets H are provided with the perforations V, whereby the water may be readily drained from the phosphates as the latter are passed out of the screen.

Having thus described my invention, what I claim as new, and desire to secure by Letters Patent, is—

1. In a phosphate-separator and washer, the primary screen G at the receiving end of the screen E and the closed chute F', surrounding said screen G, said chute F' and said screen G being conical in reverse order, in combination with the converging buckets H, with the hood H' thereover at the discharge end of said screen E, substantially as described.

2. A phosphate-separator and washer consisting of the screen E, the water-tank A, into which it dips, and the conveyer M in said tank, the primary screen G at the receiving end of the screen E, and the closed chute F', surrounding said screen G, said chute F' and said screen G being conical in reverse order, and the converging buckets H, with the hood H' thereover at the discharge end of said screen E, said parts being combined substantially as described.

GEORGE R. BOAZ.

Witnesses:
N. D. SMITH,
O. H. BOAZ.